United States Patent [19]
Kobayashi

[11] 4,377,326
[45] Mar. 22, 1983

[54] MACRO LENS SYSTEM

[75] Inventor: Yuko Kobayashi, Hachiouji, Japan

[73] Assignee: Olympus Optical Co., Ltd., Tokyo, Japan

[21] Appl. No.: 251,536

[22] Filed: Apr. 6, 1981

[30] Foreign Application Priority Data

Apr. 7, 1980 [JP] Japan .................................. 55-45391

[51] Int. Cl.³ .............................................. G02B 9/42
[52] U.S. Cl. .................................................. 350/471
[58] Field of Search ........................................ 350/471

[56] References Cited
U.S. PATENT DOCUMENTS 2,627,205  2/1953  Tronnier ........................ 350/471 X
3,601,472  8/1971  Gilkeson et al. ............... 350/471 X
4,232,944  11/1980  Imai ................................... 350/471

FOREIGN PATENT DOCUMENTS

48-3287   1/1973  Japan .
54-92230  7/1979  Japan .

*Primary Examiner*—John K. Corbin
*Assistant Examiner*—Scott J. Sugarman
*Attorney, Agent, or Firm*—Cushman, Darby & Cushman

[57] ABSTRACT

A macro lens system assuring aberrations favorably corrected within a wide magnification range from 1.7× to 8× comprising a first positive meniscus lens component, a second negative cemented lens component, a third negative cemented meniscus lens component and a fourth positive meniscus lens component.

5 Claims, 10 Drawing Figures

SPHERICAL ABERRATION
F/2.8

ASTIGMATISM
Y=56.8

DISTORTION
Y=56.8

COMA
Y=39.8 (F/3.5)

FIG. 3

SPHERICAL ABERRATION
F/2.8

ASTIGMATISM
Y=56.8

DISTORTION
Y=56.8

COMA
Y=39.8 (F/3.5)

FIG. 4

SPHERICAL ABERRATION
F/2.8

ASTIGMATISM
Y=56.8

DISTORTION
Y=56.8

COMA
Y=39.8 (F/3.5)

SPHERICAL ABERRATION
F/2.8

ASTIGMATISM
Y=56.8

DISTORTION
Y=56.8

COMA
Y=39.8 (F/3.5)

SPHERICAL ABERRATION
F/2.8

ASTIGMATISM
Y=56.8

DISTORTION
Y=56.8

COMA
Y=39.8 (F/3.5)

MACRO LENS SYSTEM

BACKGROUND OF THE INVENTION (a) Field of the Invention

The present invention relates to a macro lens system, and more specifically to a macro lens system assuring aberrations favorably corrected within a wide magnification range from 1.7× to 8× and having a high aperture ratio of F/2.8.

(b) Description of the Prior Art

Generally speaking, a macro lens system should desirably permit varying magnification within a wide range so as to cover a wide magnification range with a single lens system. However, aberrations are remarkably varied by changing magnification levels can hardly be balanced adequately over the entire magnification range.

Further, in practical use of the macro lens system, it is brought into focus on the center of an image with the stop fully open and then the stop is closed until depth of field required for photographing is obtained. It is therefore necessary to preliminarily match the best central image position in fully open condition with that in the stop down condition. Moreover, the effective F number (Fe) which is expressed as Fe=F(1+β) is larger and visual field of the viewfinder is darker as magnification β is enhanced. In order to perform focusing with high precision, however, the macro lens system should desirably have brightness on the order of F/2.8.

As the conventional macro lens systems, there have hitherto been known those which were disclosed by Japanese published unexamined patent application No. 92230/79 and Japanese published examined patent application No. 3287/73. However, the former conventional example provides a macro lens system which is as bright as F/2.8 but is limited in its applicable range to magnification levels of 1.5× to 5×. The latter conventional example provides a macro lens system which has an aperture ratio of F/2.8 and a complicated composition comprising five components of seven lens elements, and another macro lens system which has relatively simple composition comprising four components of six lens elements but is not sufficient in brightness (F/4), thereby making focusing rather difficult.

SUMMARY OF THE INVENTION

A general object of the present invention is to provide a macro lens system which can assure minimized variations in aberrations, especially spherical aberration, resulting from variation of magnification within a wide range from 1.7× to 8×, aberrations favorably corrected at individual magnification levels and high brightness of F/2.8.

In order to accomplish the above-mentioned object, it is necessary to coincide the best image position decided by spherical aberration with that decided by offaxial aberration in the stop down condition, and further coincide these best image positions with that decided by spherical aberration with the stop fully open while minimizing variations in aberrations resulting from change of magnification levels and equalizing variation directions and degrees of aberrations. It is further necessary to minimize absolute quantities of aberrations produced. For these purposes, the macro lens system according to the present invention comprises four components of six lens elements, i.e., a first positive meniscus lens component having a convex surface on the object side, a second negative cemented meniscus lens component having a convex surface on the object side and consisting of a positive lens element and a negative lens element, a third negative cemented meniscus lens component having a convex surface on the image side and consisting of a positive lens element and a negative lens elements, and a fourth positive meniscus lens component having a convex surface on the image side, and is so designed as to satisfy the following conditions (1) through (8):

(1) $1.7 < n_1, n_6$ (2) $50 < \nu_1, \nu_6, 60 < \nu_2, \nu_5$ (3) $0.118f < d_3 + d_4 < 0.128f$ (4) $0.184f < d_5 < 0.211f$ (5) $1.0 < |r_5/r_6| < 1.10$ (6) $1.2 < |r_{10}/r_1| < 1.36$ (7) $1.0 < |r_8/r_3| < 1.1$ (8) $0.95 < (d_3 + d_4)/(d_6 + d_7) < 1.04$ wherein the reference symbol f represents focal length of the lens system as a whole, the reference symbols $n_1$ and $n_6$ respresent refractive indices of said first and fourth lens components respectively, the reference symbols $\nu_1$, $\nu_2$, $\nu_5$ and $\nu_6$ designate Abbe's numbers of said first lens component, the object side element of said second lens component, the image side element of said third lens component and said fourth lens components, the reference symbols $r_1$, $r_3$, $r_5$, $r_6$, $r_8$ and $r_{10}$ denote radii of curvature on the object side of said first lens component, the object side surface and image side surface of said second lens component, the object side surface and image side surface of said third lens component and the image side surface of said fourth lens component respectively the reference symbols $d_3$, $d_4$, $d_6$ and $d_7$ represent thicknesses of both the elements of said second lens component and both the elements of said third lens component, and the reference symbol $d_5$ denotes airspace reserved between said second and third lens components. Now, significance of the above-mentioned conditions will be described consecutively below.

By using glass materials having such high refractive indices as defined by the condition (1) for the first and fourth lens components which have high influence on spherical aberration, aberrations especially production degree and variation of spherical aberration have been minimized at individual magnification levels. If this condition is not satisfied, degrees and variations of aberrations will be aggravated By using glass materials having such low dispersion powers as defined by the condition (2) for the first lens component, fourth lens component, object side element of the second lens component and image side element of the third lens component, variation of chromatic aberration between different magnification levels has been minimized. If this conidition is not satisfied, variation of chromatic aberration will be increased.

The condition (3) is required for correcting spherical aberration at high magnification levels. If the lower limit of this condition is exceeded, spherical aberration will be aggravated toward the negative side and cannot be corrected. If the upper limit of the condition (3) is exceeded, the best image positions will not be coincided between the axial rays and offaxial rays.

The condition (4) has been adopted to prevent coma from being produced by the lens surfaces located on both the sides of the stop. If the upper limit of this condition is exceeded, spherical aberration and coma will be aggravated. If the lower limit of the condition (4) is exceeded, in contrast, coma will be unbalanced too much to be corrected.

The conditions (5) through (8) is necessary for correcting distortion and coma by maintaining symmetry between the lens groups arranged on both the sides of the stop. If the upper or lower limits of these conditions are exceeded, both coma and distortion will be aggravated.

In addition, it is preferable to use extraordinarily dispersive glass materials having larger $\theta_{gF} = (n_g - n_F/n_{F-nC})$ values than that of ordinary glass material for the object side element of the second lens component and the image side element of the third lens component. This means will correct chromatic aberration due to the "g" line by enhancing refractive indices for the "g" line.

DETAILED DESCRIPTION OF THE PREFERRED EMBODIMENTS

Now, numerical data for the macro lens system will be mentioned as preferred embodiments of the present invention:

Embodiment 1

$r_1 = 44.067$
$r_2 = 422.461$
$r_3 = 31.229$
$r_4 = 305.343$
$r_5 = 23.375$ $d_1 = 6.448$  $n_1 = 1.72916$  $\nu_1 = 54.68$
$d_2 = 0.474$
$d_3 = 9.238$  $n_2 = 1.617$  $\nu_2 = 62.79$
$d_4 = 3.027$  $n_3 = 1.7495$  $\nu_3 = 35.27$
$d_5 = 20.24$

-continued $r_6 = -22.540$
$r_7 = 1002.356$
$r_8 = -33.421$
$r_9 = -701.974$
$r_{10} = -58.009$
$f = 100$,
$\nu_1 = 54.68$,
$\nu_5 = 62.79$,
$|r_5/r_6| = 1.037$,
$|r_8/r_3| = 1.070$, $d_6 = 3.053$  $n_4 = 1.804$  $\nu_4 = 46.57$
$d_7 = 9.212$  $n_5 = 1.617$  $\nu_5 = 62.79$
$d_8 = 1.763$
$d_9 = 5.659$  $n_6 = 1.755$  $\nu_6 = 52.33$
$n_1 = 1.72916$,  $n_6 = 1.755$
$\nu_6 = 52.33$,  $\nu_2 = 62.79$
$d_3 + d_4 = 12.265$,  $d_5 = 20.24$
$|r_{10}/r_1| = 1.316$
$(d_3 + d_4)/(d_6 + d_7) = 1$ Embodiment 2

$r_1 = 43.339$
$r_2 = 397.833$
$r_3 = 32.131$
$r_4 = 332.835$
$r_5 = 23.613$
$r_6 = -22.311$
$r_7 = 677.820$
$r_8 = -33.740$
$r_9 = -621.241$
$r_{10} = -55.058$
$f = 100$,
$\nu_1 = 54.68$,
$\nu_5 = 62.79$,
$|r_5/r_6| = 1.058$,
$|r_8/r_3| = 1.050$, $d_1 = 6.689$  $n_1 = 1.72916$  $\nu_1 = 54.68$
$d_2 = 0.771$
$d_3 = 8.450$  $n_2 = 1.617$  $\nu_2 = 62.79$
$d_4 = 3.842$  $n_3 = 1.7495$  $\nu_3 = 35.27$
$d_5 = 19.166$
$d_6 = 3.163$  $n_4 = 1.804$  $\nu_4 = 46.57$
$d_7 = 9.221$  $n_5 = 1.617$  $\nu_5 = 62.79$
$d_8 = 0.795$
$d_9 = 6.118$  $n_6 = 1.755$  $\nu_6 = 52.33$
$n_1 = 1.72916$,  $n_6 = 1.755$
$\nu_6 = 52.33$,  $\nu_2 = 62.79$
$d_3 + d_4 = 12.292$,  $d_5 = 19.166$
$|r_{10}/r_1| = 1.27$
$(d_3 + d_4)/(d_6 + d_7) = 0.993$

Embodiment 3

$r_1 = 44.019$
$r_2 = 419.364$
$r_3 = 31.332$
$r_4 = 362.464$
$r_5 = 23.368$
$r_6 = -22.266$
$r_7 = -8503.992$
$r_8 = -33.338$
$r_9 = -550.872$
$r_{10} = -56.032$
$f = 100$,
$\nu_1 = 54.68$,
$\nu_5 = 62.79$,
$|r_5/r_6| = 1.049$,
$|r_8/r_3| = 1.064$, $d_1 = 7.108$  $n_1 = 1.72916$  $\nu_1 = 54.68$
$d_2 = 0.395$
$d_3 = 9.250$  $n_2 = 1.617$  $\nu_2 = 62.79$
$d_4 = 3.011$  $n_3 = 1.7495$  $\nu_3 = 35.27$
$d_5 = 20.277$
$d_6 = 3.017$  $n_4 = 1.804$  $\nu_4 = 46.57$
$d_7 = 9.279$  $n_5 = 1.617$  $\nu_5 = 62.79$
$d_8 = 0.5$
$d_9 = 6.884$  $n_6 = 1.755$  $\nu_6 = 52.33$
$n_1 = 1.72916$,  $n_6 = 1.755$
$\nu_6 = 52.33$,  $\nu_2 = 62.79$
$d_3 + d_4 = 12.261$,  $d_5 = 20.277$
$|r_{10}/r_1| = 1.273$
$(d_3 + d_4)/(d_6 + d_7) = 0.997$ wherein the reference symbols $r_1$ through $r_{10}$ represent radii of curvature on the surfaces of the respective lens elements, the reference symbols $d_1$ through $d_9$ designate thickness of the respective lens elements and airspaces reserved therebetween, the reference symbols $n_1$ through $n_8$ denote refractive indices of the respective lens elements, the reference symbols $\nu_1$ through $\nu_6$ represent Abbe's numbers of the respective lens elements and the reference symbol f designates focal length of the macro lens system as a whole. All the embodiments described above adopt a glass material having $\theta_{gF}=0.543$ at $\nu_d=62.8$ for the object side element of the second lens component and the image side element of the third lens component (an ordinary glass material has $\theta_{gF}=0.537$ or so at $\nu_d=62.8$).

Figure 1:
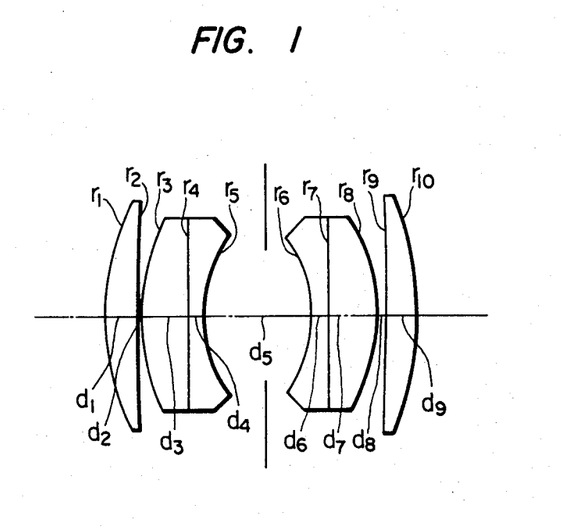
FIG. 1 shows a sectional view illustrating composition of the macro lens system according to the present invention.
Figure 2:
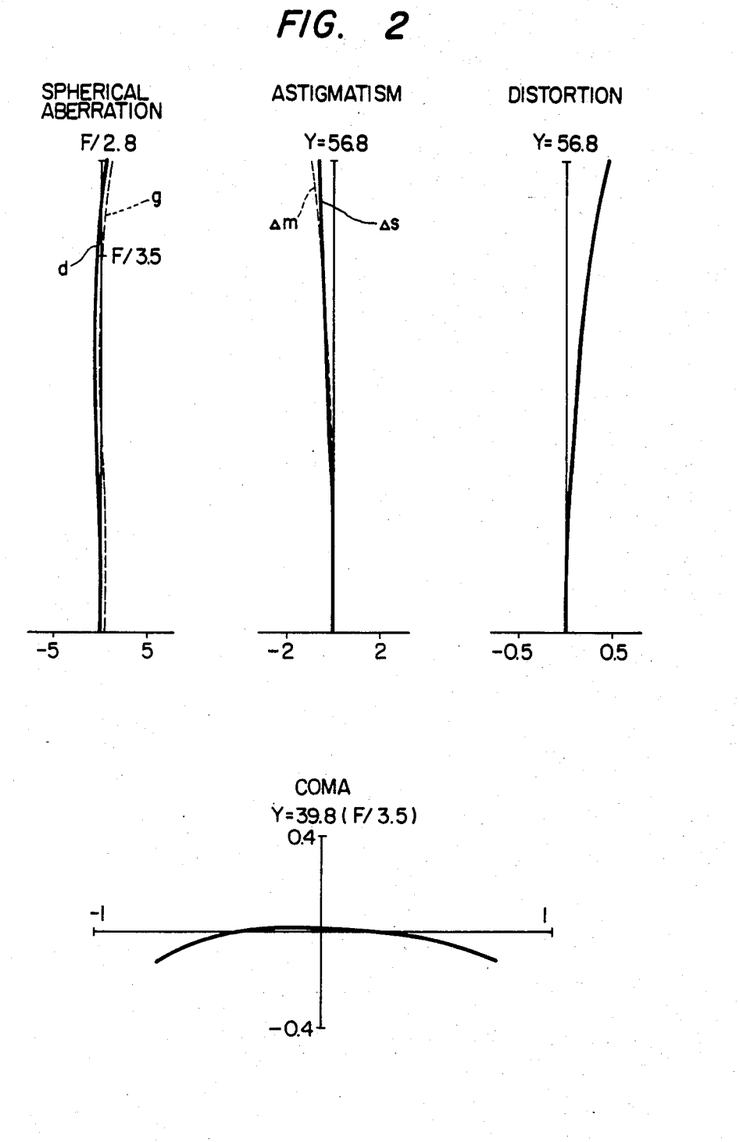
FIGS. 2 through FIG. 4 show curves illustrating the aberration characteristics of an embodiment 1 of the macro lens system according to the present invention at magnification levels of 17×, 4× and 8× respectively.
Figure 3:
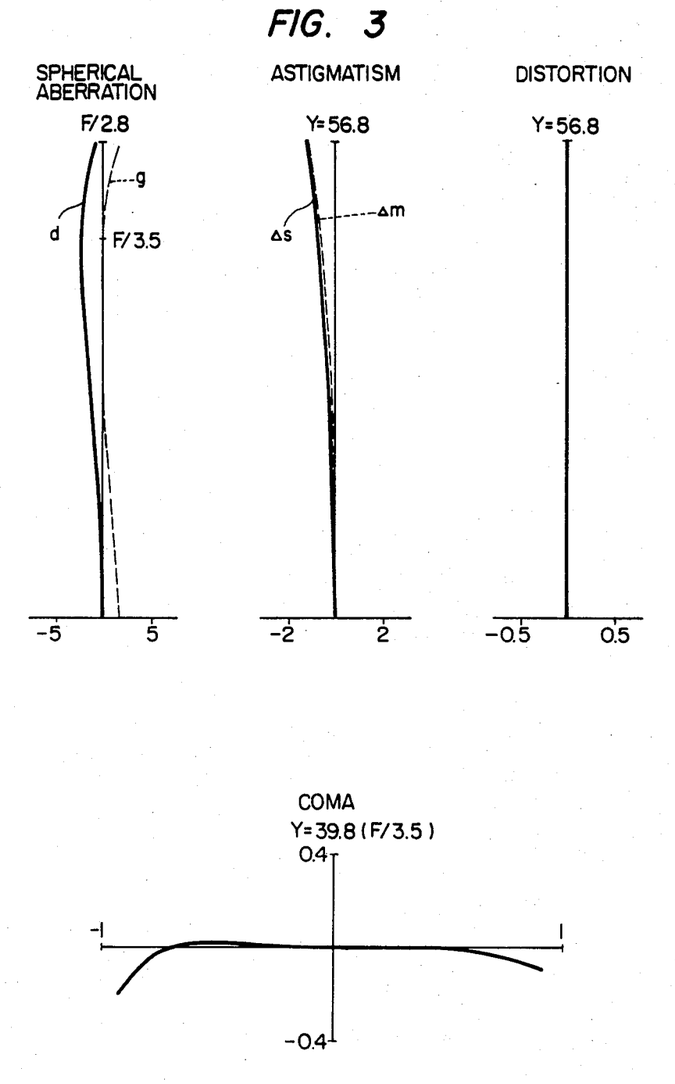
Figure 4:
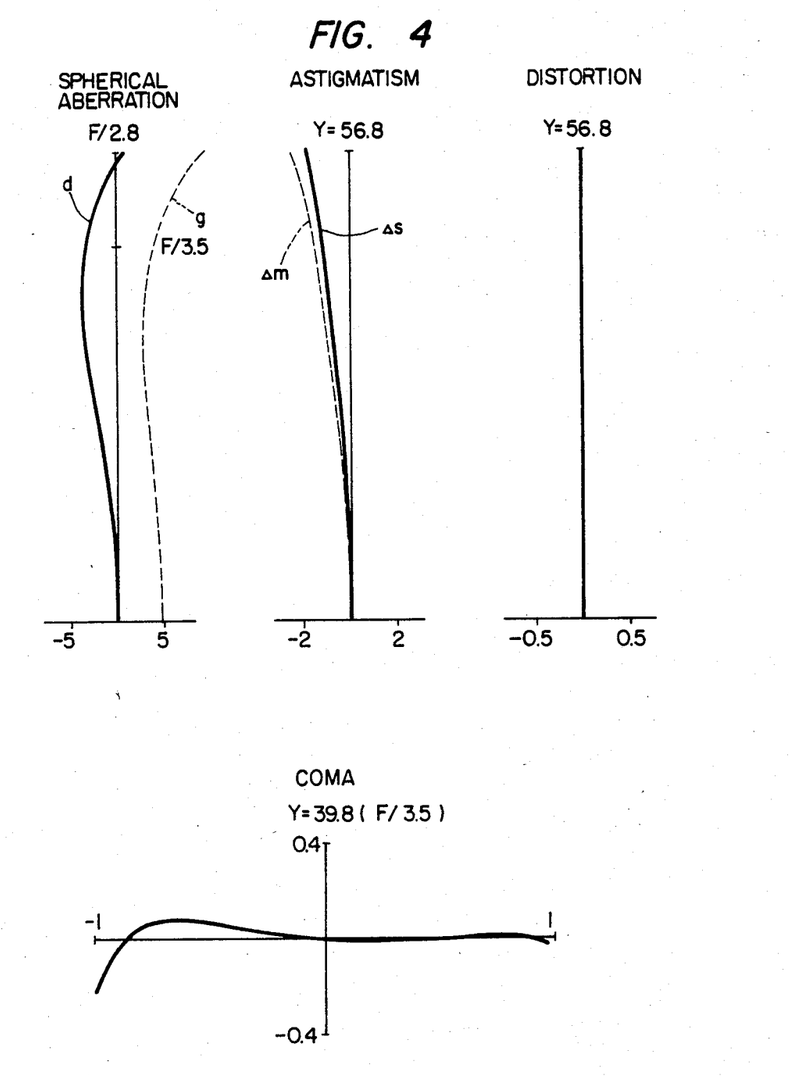
Figure 5:
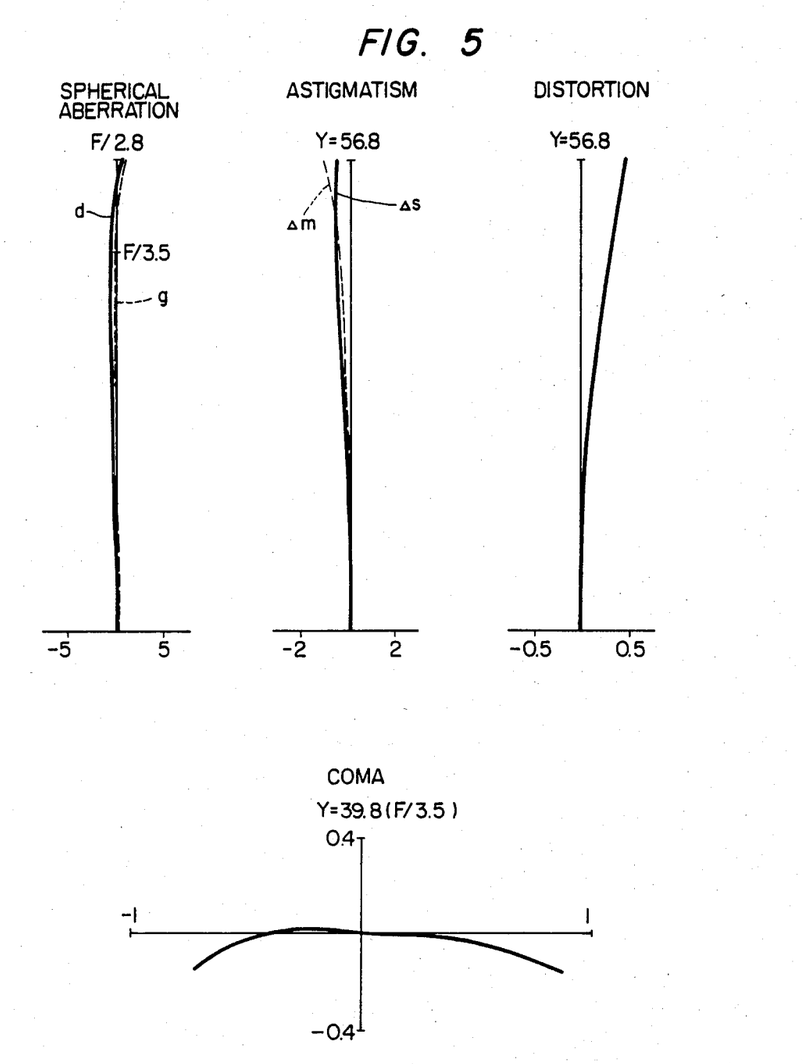
FIG. 5 through FIG. 7 show curves illustrating the aberration characteristics of an embodiment 2 of the present invention at the above-mentioned magnification levels respectively.
Figure 6:
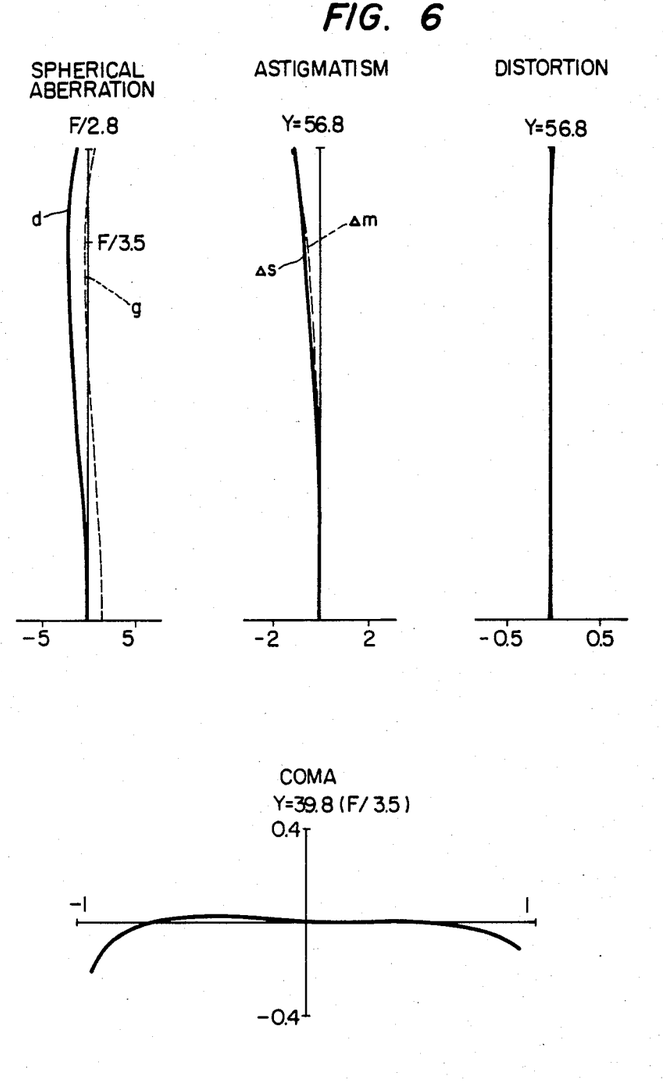
Figure 7:
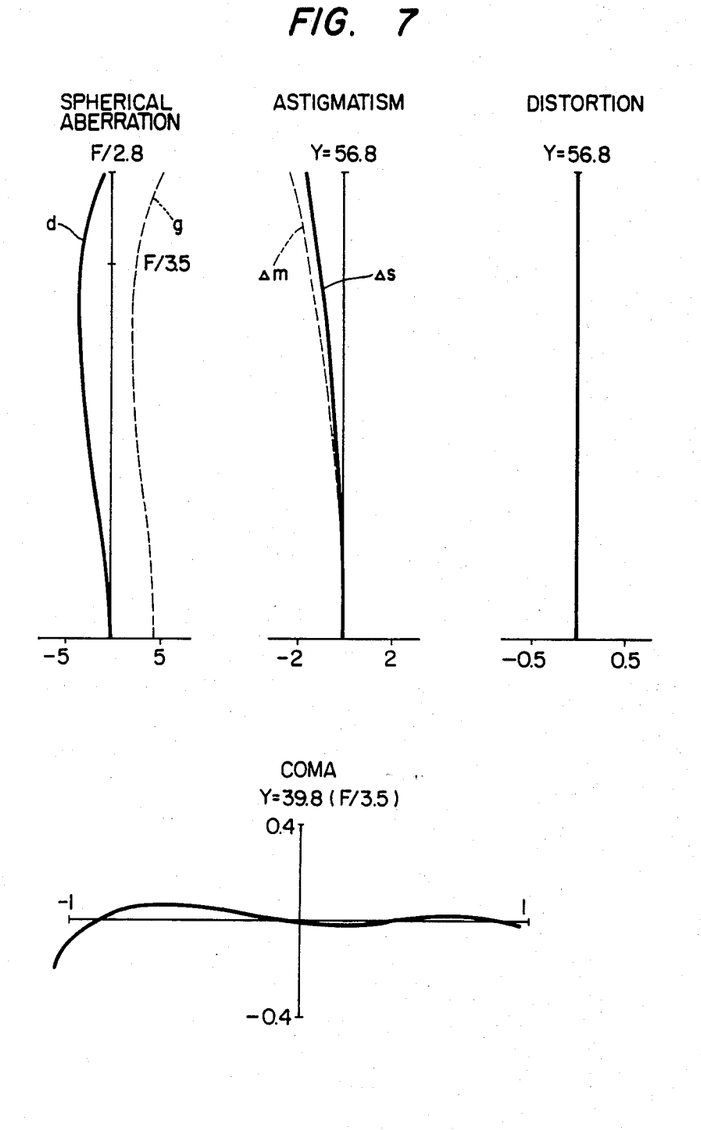
Figure 8:
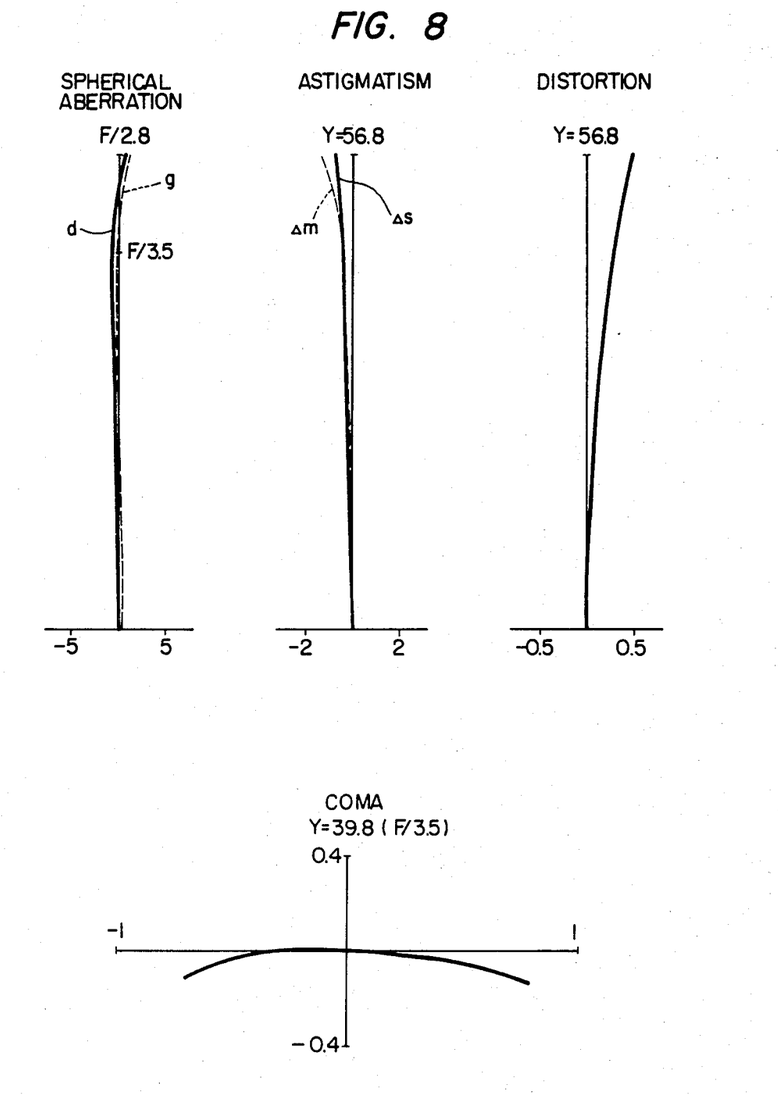
FIG. 8 through FIG. 10 show curves illustrating the aberration characteristics of an embodiment 3 of the present invention at the above-mentioned magnification levels respectively.
Figure 9:
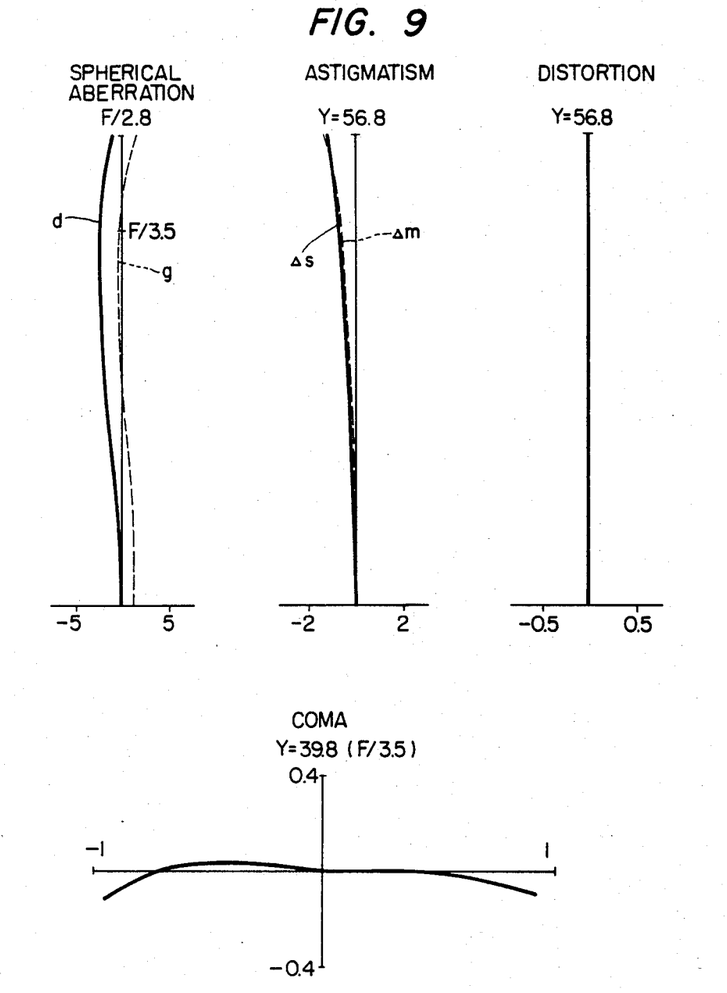
Figure 10:
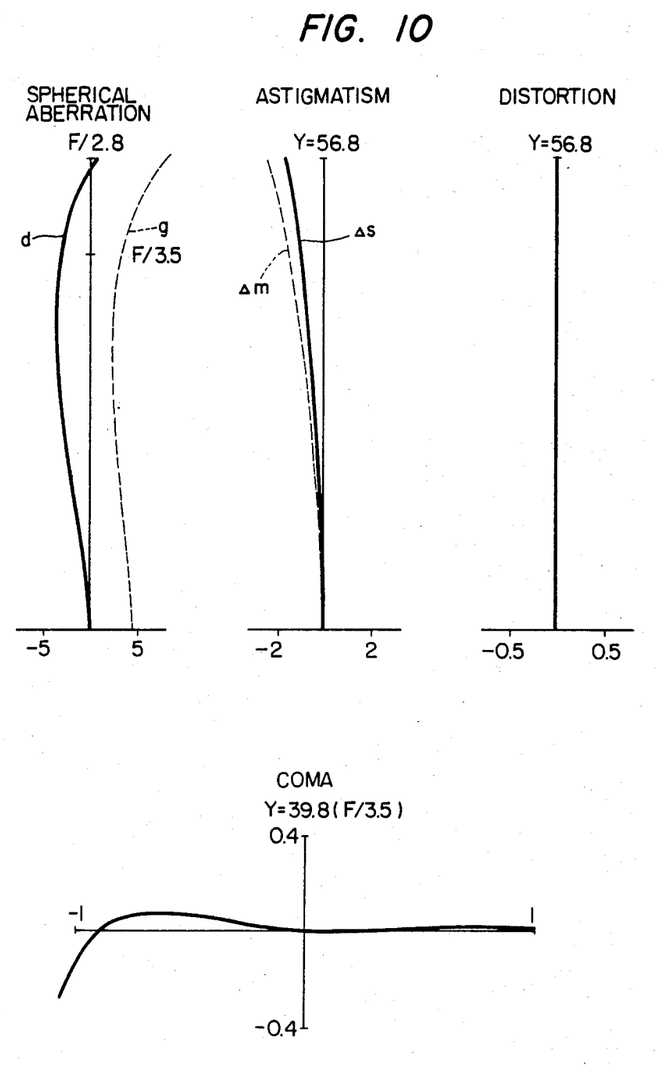

Aberration characteristics of these embodiments are visualized in FIG. 2 through FIG. 10: FIG. 2, FIG. 3 and FIG. 4 illustrating aberration characteristics of the Embodiment 1 at magnification levels of 1.7×, 4× and 8×; FIG. 5, FIG. 6 and FIG. 7 illustrating aberration characteristics of the Embodiment 2 at magnification levels of 1.7×, 4× and 8×; and FIG. 8, FIG. 9 and FIG. 10 illustrating aberration characteristics of the Embodiment 3 at magnification levels of 1.7×, 4× and 8× respectively. Out of the aberrations, coma is visualized at an aperture ratio of F/3.5. In this way, all the offaxial aberrations are corrected at the aperture ratio of F/3.5 since the macro lens system according to the present invention is set at the aperture ratio of F/3.5 by closing the stop for photographing after it is brought into focus at an aperture ratio of F/2.8.

In addition, Seidel coefficients of the Embodiment 1 when it is set at a magnification level of 1.7× will be presented for reference below:

|  | Spherical aberration | Astigmatism | Coma | Distortion | Retzval |
|---|---|---|---|---|---|
|  | 93.0404 | 0.0170 | 1.2587 | 0.0394 | 2.8942 |
|  | 1.2536 | 1.8420 | −1.5196 | −1.8668 | −0.3019 |
|  | 13.1921 | 0.1338 | 1.3284 | 0.3856 | 3.6955 |
|  | −5.5526 | −0.9298 | 2.2722 | 0.3615 | 0.0464 |
|  | −43.5899 | −0.9671 | −6.4926 | −0.9697 | −5.5432 |
|  | −79.2389 | −0.9899 | 8.8568 | 0.7791 | −5.9802 |
|  | −7.8097 | −1.4736 | −3.3924 | −0.6485 | −0.0193 |
|  | 7.0569 | 0.1343 | −0.9735 | −0.4949 | 3.4531 |
|  | 1.1263 | 1.9604 | 1.4859 | 2.3418 | −0.1854 |
|  | 25.0882 | 0.1800 | −2.1248 | −0.2052 | 2.2430 |
| sum | 4.5664 | −0.0930 | 0.6990 | −0.2777 | 0.3021 |

As is understood from the foregoing descriptions and the Embodiments set forth as preferred examples, the macro lens system according to the present invention is designed for a high aperture ratio of F2.8, thereby facilitating focusing, suppressing production degrees of aberrations to low levels, minimizing variations of aberrations resulting from changes of magnification levels and permitting favorable photographing.

I claim:

1. A macro lens system comprising a first positive meniscus lens component having a convex surface on the object side, a second naegative cemented meniscus lens component consisting of a positive element and a negative element and having a convex surface on the object side, a third negative cemented meniscus lens component consisting of a positive element and a negative element and having a convex surface on the image side, and a fourth positive meniscus lens component having a convex surface on the image side, said macro lens system satisfying the following conditions:

(1) $1.7 < n_1, n_6$ (2) $50 < \nu_1, \nu_6, 60 < \nu_2, \nu_5$ (3) $0.118f < d_3+d_4 < 0.128f$ (4) $0.184f < d_5 < 0.211f$ (5) $1.0 < |r_5/r_6| < 1.10$ (6) $1.2 < |r_{10}/r_1| < 1.36$ (7) $1.0 < |r_8/r_3| < 1.1$ (8) $0.95 < (d_3+d_4)/(d_6+d_7) < 1.04$ wherein the reference symbol f represents focal length of said macro lens system as a whole, the reference symbols $n_1$ and $n_6$ designate refractive indices of said first lens component and said fourth lens component respectively, the reference symbols $\nu_1$, $\nu_2$, $\nu_5$ and $\nu_6$ denote Abbe's numbers of said first lens component, the object side element of said second lens component, the image side element of said third lens component and said fourth lens component respectively, the reference symbols $d_3$, $d_4$, $d_6$ and $d_7$ represent thicknesses of both the elements of said second lens component and both the elements of said third lens component respectively, the reference symbol $d_5$ designates airspace reserved between said second and third lens components, and the reference symbols $r_1$, $r_3$, $r_5$, $r_6$, $r_8$ and $r_{10}$ denote radii of curvature on the object side surface of said first lens component, the object side surface and image side surface of said second lens component, the object side surface and image side surface of said third lens component and the image side surface of said fourth lens component respectively.

2. A macro lens system according to claim 1 wherein the object side element of said second lens component and the image side element of said third lens component are made of glass materials having large $\theta_{gF}$ values: wherein $\theta_{gF}$ is defined as $(n_g-n_F)/(n_F-n_C)$.

3. A macro lens system according to claim 1 having the following numerical data:

| | | | |
|---|---|---|---|
| $r_1 = 44.067$ | $d_1 = 6.448$ | $n_1 = 1.72916$ | $\nu_1 = 54.68$ |
| $r_2 = 422.461$ | $d_2 = 0.474$ | | |
| $r_3 = 31.229$ | $d_3 = 9.238$ | $n_2 = 1.617$ | $\nu_2 = 62.79$ |
| $r_4 = 305.343$ | $d_4 = 3.027$ | $n_3 = 1.7495$ | $\nu_3 = 35.27$ |
| $r_5 = 23.375$ | $d_5 = 20.24$ | | |
| $r_6 = -22.540$ | $d_6 = 3.053$ | $n_4 = 1.804$ | $\nu_4 = 46.57$ |
| $r_7 = 1002.356$ | $d_7 = 9.212$ | $n_5 = 1.617$ | $\nu_5 = 62.79$ |
| $r_8 = -33.421$ | $d_8 = 1.763$ | | |
| $r_9 = -701.974$ | $d_9 = 5.659$ | $n_6 = 1.755$ | $\nu_6 = 52.33$ |
| $r_{10} = -58.009$ | | | |
| $f = 100$, | $n_1 = 1.72916$, | | $n_6 = 1.755$ |
| $\nu_1 = 54.68$, | $\nu_6 = 52.33$, | | $\nu_2 = 62.79$ |
| $\nu_5 = 62.79$, | $d_3 + d_4 = 12.265$, | | $d_5 = 20.24$ |
| $|r_5/r_6| = 1.037$, | $|r_{10}/r_1| = 1.316$ | | |
| $|r_8/r_3| = 1.070$, | $(d_3 + d_4)/(d_6 + d_7) = 1$ | | | wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

4. A macro lens system according to claim 1 having the following numerical data:

| | | | |
|---|---|---|---|
| $r_1 = 43.339$ | | | |
| | $d_1 = 6.689$ | $n_1 = 1.72916$ | $\nu_1 = 54.68$ |
| $r_2 = 397.833$ | | | |
| | $d_2 = 0.771$ | | |
| $r_3 = 32.131$ | | | |
| | $d_3 = 8.450$ | $n_2 = 1.617$ | $\nu_2 = 62.79$ |
| $r_4 = 332.835$ | | | |
| | $d_4 = 3.842$ | $n_3 = 1.7495$ | $\nu_3 = 35.27$ |
| $r_5 = 23.613$ | | | |
| | $d_5 = 19.166$ | | |
| $r_6 = -22.311$ | | | |
| | $d_6 = 3.163$ | $n_4 = 1.804$ | $\nu_4 = 46.57$ |
| $r_7 = 677.820$ | | | |
| | $d_7 = 9.221$ | $n_5 = 1.617$ | $\nu_5 = 62.79$ |
| $r_8 = -33.740$ | | | |
| | $d_8 = 0.795$ | | |
| $r_9 = -621.241$ | | | |
| | $d_9 = 6.118$ | $n_6 = 1.755$ | $\nu_6 = 52.33$ |
| $r_{10} = -55.058$ | | | |
| $f = 100$, | $n_1 = 1.72916$, | | $n_6 = 1.755$ |
| $\nu_1 = 54.68$, | $\nu_6 = 52.33$, | | $\nu_2 = 62.79$ |
| $\nu_5 = 62.79$, | $d_3 + d_4 = 12.292$, | | $d_5 = 19.166$ |
| $\lvert r_5/r_6 \rvert = 1.058$, | $\lvert r_{10}/r_1 \rvert = 1.27$ | | |
| $\lvert r_8/r_3 \rvert = 1.050$, | $(d_3 + d_4)/(d_6 + d_7) = 0.993$ | | | wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

5. A macro lens system according to claim 1 having the following numerical data:

| | | | |
|---|---|---|---|
| $r_1 = 44.019$ | | | |
| | $d_1 = 7.108$ | $n_1 = 1.72916$ | $\nu_1 = 54.68$ |
| $r_2 = 419.364$ | | | |
| | $d_2 = 0.395$ | | |
| $r_3 = 31.332$ | | | |
| | $d_3 = 9.250$ | $n_2 = 1.617$ | $\nu_2 = 62.79$ |
| $r_4 = 362.464$ | | | |
| | $d_4 = 3.011$ | $n_3 = 1.7495$ | $\nu_3 = 35.27$ |
| $r_5 = 23.368$ | | | |
| | $d_5 = 20.277$ | | |
| $r_6 = -22.266$ | | | |
| | $d_6 = 3.017$ | $n_4 = 1.804$ | $\nu_4 = 46.57$ |
| $r_7 = -8503.992$ | | | |
| | $d_7 = 9.279$ | $n_5 = 1.617$ | $\nu_5 = 62.79$ |
| $r_8 = -33.338$ | | | |
| | $d_8 = 0.5$ | | |
| $r_9 = -550.872$ | | | |
| | $d_9 = 6.844$ | $n_6 = 1.755$ | $\nu_6 = 52.33$ |
| $r_{10} = -56.032$ | | | |
| $f = 100$, | $n_1 = 1.72916$, | | $n_6 = 1.755$ |
| $\nu_1 = 54.68$, | $\nu_6 = 52.33$, | | $\nu_2 = 62.79$ |
| $\nu_5 = 62.79$, | $d_3 + d_4 = 12.261$, | | $d_5 = 20.277$ |
| $\lvert r_5/r_6 \rvert = 1.049$, | $\lvert r_{10}/r_1 \rvert = 1.273$ | | |
| $\lvert r_8/r_3 \rvert = 1.064$, | $(d_3 + d_4)/(d_6 + d_7) = 0.997$ | | | wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

* * * * *